(12) United States Patent
Falk

(10) Patent No.: US 6,430,167 B1
(45) Date of Patent: Aug. 6, 2002

(54) METHOD FOR TRANSFERRING DATA OVER A SATELLITE NETWORK BY USING UNIQUE BEAM IDENTIFIERS TO ROUTE THE DATA

(75) Inventor: Aaron D. Falk, San Pedro, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/128,173

(22) Filed: Aug. 3, 1998

(51) Int. Cl.⁷ ................................................ H04L 12/56
(52) U.S. Cl. .................................... 370/325; 370/474
(58) Field of Search ................................ 370/316, 349, 370/389, 395, 401, 474, 466, 325

(56) References Cited

U.S. PATENT DOCUMENTS

| | | | |
|---|---|---|---|
| 5,432,777 A | | 7/1995 | Le Boudec et al. |
| 5,517,497 A | | 5/1996 | Le Boudec et al. |
| 5,600,629 A | | 2/1997 | Van Daele |
| 5,736,959 A | * | 4/1998 | Patterson et al. ............ 342/354 |
| 5,875,181 A | * | 2/1999 | Hsu ............................. 370/320 |
| 5,991,279 A | * | 11/1999 | Haugli et al. ................ 370/311 |
| 6,173,176 B1 | * | 1/2001 | Worger et al. ............... 455/428 |
| 6,205,473 B1 | * | 3/2001 | Thomasson et al. ......... 709/217 |
| 6,215,776 B1 | * | 4/2001 | Chau ........................... 370/316 |
| 6,310,893 B1 | * | 10/2001 | Yuan et al. |

FOREIGN PATENT DOCUMENTS

EP 0820208 1/1998

OTHER PUBLICATIONS

Roy Mauger and Catherine Rosenberg, QoS Guarantees for Multimedia Services on a TDMA–Based Satellite Network, IEEE Communications Magazine, vol. 35, No. 7, Jul. 1997, pp. 56–58, 63–65.

* cited by examiner

Primary Examiner—Douglas Olms
Assistant Examiner—Ken Vanderpuye
(74) Attorney, Agent, or Firm—Connie M. Thousand

(57) ABSTRACT

A method for transferring a data packet between a first source terminal and a first destination terminal, in a communications network having a plurality of source terminals, destination terminals, satellites and downlink antenna beams one downlink antenna beam of which covers the first destination terminal. Each data packet includes a destination address identifying a user for which the data packet is meant with the first destination terminal having the capability to reach the user. The method includes assigning a unique downlink beam identifier to each the downlink antenna beam in the communications network; mapping the destination address to a downlink beam identifier, the corresponding antenna beam of which covers the first destination terminal. The data packet is segmented into one or more cells, each cell having a cell header. The downlink beam identifier is placed into each cell header and the cells are routed to the downlink antenna beam corresponding to the downlink beam identifier. The cells are broadcasted over the downlink antenna beam and received by the destination terminals located within the downlink antenna beam where one of the destination terminals are the first destination terminal.

8 Claims, 3 Drawing Sheets

| Source Terminal Look-up Table | |
|---|---|
| Destination Address | Downlink Beam Identifier |
| 128.3.20.4 | 10 |
| 128.3.40.5 | 10 |
| 138.2.20.3 | 11 |
| ⋮ | ⋮ |
| 139.12.40.72 | 400 |
| 162.20.30.8 | 400 |

| Satellite Look-up Table | |
|---|---|
| Downlink Beam Identifier | Local Routing Tag |
| 10 | 1 (Crosslink) |
| 11 | 1 (Crosslink) |
| 12 | 2 (Downlink) |
| ⋮ | ⋮ |
| 300 | 2 (Downlink) |
| 301 | 3 (Downlink) |

FIG. 4A

| Satellite Look-up Table | |
|---|---|
| Downlink Beam Identifier | Local Routing Tag |
| 10 | 2 (Downlink) |
| 11 | 2 (Downlink) |
| 12 | 1 (Crosslink) |
| ⋮ | ⋮ |
| 300 | 1 (Crosslink) |
| 301 | 1 (Crosslink) |

FIG. 4B

METHOD FOR TRANSFERRING DATA OVER A SATELLITE NETWORK BY USING UNIQUE BEAM IDENTIFIERS TO ROUTE THE DATA

BACKGROUND OF THE INVENTION

The present invention relates generally to data transfer systems, and more particularly to a method for sending data in a broadcast network.

Connection-oriented networks are traditionally associated with telephony and other types of communications where an association between a sender and receiver exists for a relatively long period of time (i.e. on the order of minutes). Connection-oriented communications is used when resources need to be nailed down to guarantee that the data is received and processed by the proper destination terminal. Connection-oriented communications is typically used for data which is sensitive to delay and/or delay variation.

The process of exchanging information on a connection-oriented network usually requires some signaling between the source and destination (and possibly a network manager) to negotiate the parameters of the connection before any useful data is exchanged. This is efficient when the delay required for signaling is small relative to the duration of the time spent to exchange information. The Asynchronous Transfer Mode (ATM) protocol is typically used for data message transfers in connection-oriented communications because it is a relatively fast, highly reliable switching protocol.

In contrast, connectionless networks such as the global Internet, are traditionally associated with computer networks and other types of communications where an association between a sender and receiver exists on a per-packet basis (i.e. on the order of milliseconds). Connectionless communication networks do not utilize advance signaling before sending data; therefore, there is no opportunity for the network to evaluate whether a given transmission can be guaranteed to reach its destination in a timely manner. Connectionless communications is typically used for lower priority data, such as Internet Protocol (IP) data, where it is not imperative that data will arrive at and be processed by the proper destination terminal. The connectionless protocol used by the global Internet, is referred to as a "best effort" protocol.

Once a geosynchronous satellite is introduced into the path between the source and destination or between the source and the network manager, the cost in delay of performing connection-oriented communications is exacerbated. For connection-oriented communications over a satellite with an on-board cell relay switch, to establish a communications link between a source terminal and a destination terminal, the following steps need to be conducted:

a) A request is sent from the source terminal over the satellite to the Network Operations Center (NOC) asking for a connection identification address (CID) for the destination terminal and a channel for communications.

b) A channel and CID and path through the satellite cell switch are allocated by the NOC.

c) The channel allocation, CID, and path through the satellite cell switch are sent to the satellite.

d) The channel allocation and CID are sent to both the source terminal and the destination terminal.

Although this set-up procedure requires a significant amount of time, it accomplishes many purposes the most significant of which is that a path from a satellite uplink to a satellite downlink is created through the satellite network for the routing of cells with the header CID. In addition, the source terminal will know that it can use the allocated channel for communication with the desired destination terminal; the desired destination terminal will listen only to the allocated channel and accept only the packets with the proper CID in the header; and, other destination terminals do not use their resources to accept packets not intended for their use freeing up resources for communications with other source terminals.

After the set-up procedure is completed, to send a message from the source terminal to the destination terminal, the following additional steps must be completed:

a) The source terminal divides the message into cells in accordance with a predetermined adaptation layer protocol, if the message is longer than a single ATM cell. As required by the adaptation layer protocol, each cell includes a header. The source terminal places the allocated CID into the proper location in the header of each cell.

b) The cells are sent to a satellite.

c) Each cell is routed to the downlink antenna which covers the desired destination terminal.

d) The cells are broadcast by the downlink antenna.

e) The cells with the proper CID in the header are accepted by the destination terminal and reassembled back into the original massage.

The CID is an address identifying the connection between a specific source terminal and destination terminal. It is temporary and used for the single communication. After the communication between the source terminal and the destination terminal is complete, the connection is broken and the channel can be reused for another communication either between the same source and destination terminal or a new source and destination terminal. The CID can also be reused for another communication either between the same source and destination terminal or a new source and destination terminal.

In contrast, for connectionless communications, the message is sent from the source terminal to the destination terminal without first completing the set-up portion of the procedure. Sending a message in a connectionless communications networks takes much less set-up time than sending a message in a connection-oriented communications system since the set-up procedure with a NOC or network manager is not required. However, in a connectionless communications system there is no guarantee that the destination terminal will have the channel capacity available to receive the packets nor is there guarantee of resources in the on-board cell switch.

Delays could be experienced if a connection-oriented system were used to send data in a connectionless manner including a delay in establishing a connection and a delay in receiving messages. In addition, decisions must constantly be made about whether or not to maintain an idle connection, thereby tying up satellite resources, or terminating the connection and experiencing a delay in re-establishing the connection later.

With the advent of the Internet, the demand to transport data in a connectionless manner has increased tremendously. Therefore, it would be advantageous to develop a scheme to send data, such as IP data, in a connectionless manner over a system which supports connection-oriented communications and do so in a manner which is compatible with the ATM protocol used in many connection oriented systems.

U.S. Pat. Nos. 5,432,777 and 5,517,497 disclose a method for sending data in a connectionless manner over a connection-oriented network which includes assigning a routing identifier (RI) to each terminal in the network and placing a destination terminal RI in the header of each cell of the message. For this method, the source terminal consults a global lookup table which correlates each terminal in the system with an RI in a unique mapping. The source terminal places the destination terminal RI in the header of each cell. The cells are sent to a node in the system. Each node must read the destination terminal RI in the header of each cell and determine the proper routing sequence required for the cells to be transmitted to the proper destination terminal. When applied to a satellite network, this method requires resources in each satellite to read the destination terminal RI, look up the destination terminal RI in a lookup table and possibly assign a routing tag to the cell to route it through each satellite's cell switches.

The cells are routed through each satellite to the desired destination terminal. The destination terminal only accepts cells having its individual destination terminal RI in the headers. The method disclosed in the '777 and '497 patents is not optimal for all communication networks. In particular, by using a unique destination terminal RI located in the header of each cell, the method disclosed in the '777 and '497 patents does not take advantage of the broadcast capability of a satellite network having multiple downlink antennas where each downlink antenna typically covers many destination terminals. In such a network, a single address can reach many destination terminals such that a unique destination terminal RI in the header of each cell is not required for the cell to arrive at the desired destination terminal.

After the data is routed to the proper destination terminal, the destination terminal typically must separate, or demultiplex, the cells since cells sent from different source terminals are multiplexed together before arriving at the destination terminal. To separate multiple streams of data coming from different source terminals to the same destination terminal, the '777 and '497 patents discloses using a multiplexing identification (MID) field in the cell headers where the value of the MID field allows, at the destination side, to identify the cells which belong to the same connectionless message. This value has to be unique. The '777 and '497 patents prefer that the source RI value be used as the MID and either the last ten bits of the RI value are taken as the MID or, the header is extended to allow more bits to be used. Using the MID field to demultiplex cells from different sources restricts the ATM Adaptation Layer (ML) protocol which can be used to demultiplex the cells to the ATM Adaptation Layer 3/4 (AAL3/4) protocol. A more detailed discussion of ATM Adaptation Layer protocols including the ATM Adaptation Layer 3/4 (AAL3/4) and the ATM Adaptation Layer 5 (AAL5) protocols can be found in CCITT, "Draft Recommendation I.363". CCITT Study Group XVIII, Geneva, Jan. 19–29 1993. The ATM Adaptation Layer 3/4 (AAL3/4) protocol has a MID field, but, the ATM Adaptation Layer 5 (ML5) protocol does not. Therefore, the method specified in the '777 and '497 patents does not support the newer ATM Adaptation Layer 5 (AAL5) protocol which is typically the adaptation layer protocol of choice for IP data transfers among those skilled in the art. Thus, the scheme defined in the '777 and '497 patents are deficient for various network environments.

What is needed therefore is a method for sending data in a connectionless manner over a network which supports the ATM and established connections for data message transfers which takes advantage of the broadcast capabilities of a satellite system. The method should additionally support the use of higher order adaptation layer protocol, in particular, the adaptation layer 5 protocol.

SUMMARY OF THE INVENTION

The preceding and other shortcomings of the prior art are addressed and overcome by the present invention which provides, in a first aspect, a method for transferring a data packet between a first source terminal and a first destination terminal, in a communications network having a plurality of source terminals, destination terminals, satellites and downlink antenna beams where one of the downlink antenna beam covers said first destination terminal. Each data packet includes a destination address identifying a user for which the data packet is meant with the first destination terminal having the capability to reach the user.

The method includes assigning a unique downlink beam identifier to each downlink antenna beam in the communications network; mapping the destination address to a downlink beam identifier the corresponding antenna beam of which covers the first destination terminal. The data packet is segmented into one or more cells, each cell having a cell header. The downlink beam identifier is placed into each cell header and the cells are routed to the downlink antenna beam corresponding to the downlink beam identifier. The cells are broadcasted over the downlink antenna beam and received by the destination terminals located within the downlink antenna beam of which one of the destination terminals is the first destination terminal.

In a second aspect, a source terminal identifier is placed into each cell header to be used by the destination terminals to sort cells sent from different source terminals.

In a third aspect, the satellite network uses the Asynchronous Transfer Mode for data message transfers.

In a fourth aspect, the data packet in an Internet Protocol (IP) packet which includes a destination IP address.

BRIEF DESCRIPTION OF THE DRAWINGS

Reference is now made to the detailed description of the preferred embodiments illustrated in the accompanying drawings, in which:

FIG. 4a shows an example of a satellite look-up table; and,

FIG. 4b shows an example of a second satellite look-up table.

DETAILED DESCRIPTION OF THE PREFERRED EMBODIMENTS

The present invention overcomes the limitations of the prior art by providing a method for transferring a data packet such as IP protocol data, between a source terminal and a first destination terminal, over a network by using a downlink beam identifier to route the data, as contrasted with the use of a destination terminal identifier as described in the prior art. By using a downlink beam identifier to route the data, the present invention takes advantage of the broadcast capability available in a satellite system. One embodiment of the invention provides a method for transferring data in a connectionless manner in a network which supports connection-oriented communications; and, a second embodiment of the invention provides a method for transferring data in a connectionless manner over a network which uses the ATM protocol for data message transfers and additionally supports connection-oriented communications. The preferred embodiment of the invention is additionally compatible with the ATM Adaptation Layer 5 (AAL5) protocol.

Figure 1:
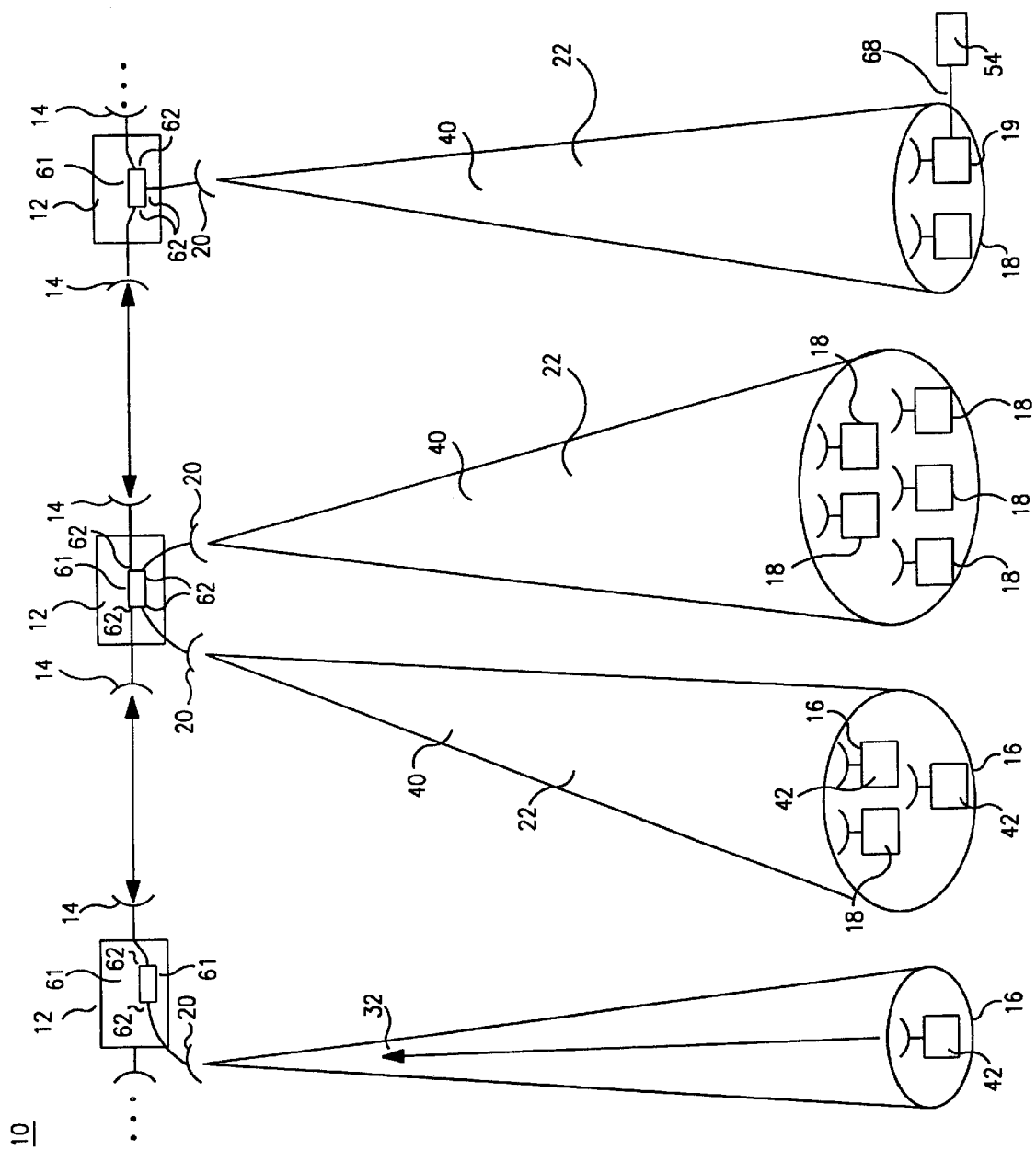
FIG. 1 is a schematic diagram of a communications network in which the present invention may be used.

FIG. 1 shows the configuration of a communications network 10 in which the present invention may be used. The network 10 includes several satellites 12 which are interlinked by the use of the crosslink antennas 14. A plurality of source 16 and destination 18 & 19 terminals are linked to the satellites 12 by way of the antennas 20. Any source terminal 16 can be a destination terminal 18 & 19 and vice versa. Each antenna 20 has a downlink antenna beam 22 which can cover a plurality of destination terminals 18 & 19. The antennas 20 can be multiple beam antennas where each antenna 20 provides a multiplicity of antenna beams 22. The antennas 20 can also be dual uplink/downlink antennas, dedicated uplink and downlink antennas or the like. In addition, uplink channels may be shared or dedicated to a single source terminal 16.

Each satellite 12 can have one or more crosslink antennas 14 making a variety of satellite network configurations such as a star network or a ring network possible. However, the invention will be explained for the general case of a linear network 10 shown in FIG. 1. For the preferred embodiment of the invention, the network 10 is a network 10 which uses the ATM protocol for data message transfers and additionally supports connection-oriented traffic.

Figures 2, 3:
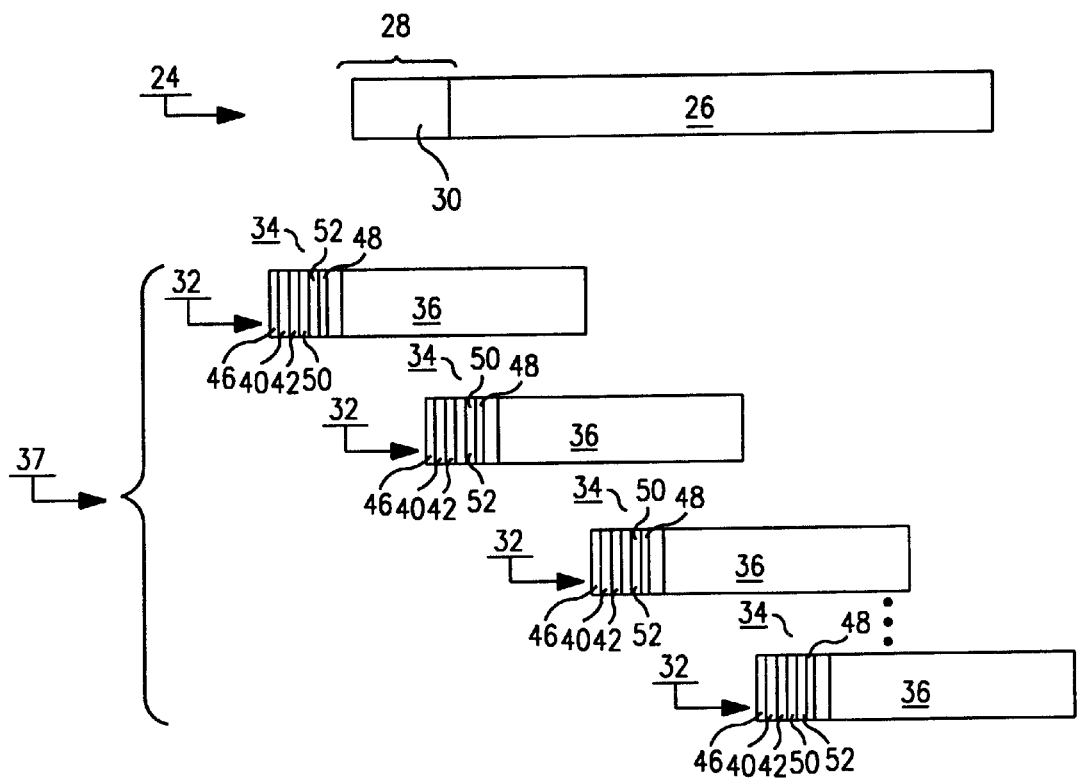
FIG. 2 shows a data packet and the cells formed after segmentation of the data packet per an adaptation layer segmentation process.
FIG. 3 shows an example of a source terminal look-up table.

As shown in FIG. 2, a data packet 24, which can be an IP data packet or any packet which is desired to be sent over the network 10, includes a message body 26 and a message header 28. The message header 28 includes the destination address 30. The data packet 24 is preferably an IP packet 24 which includes an IP message 26 and an IP header 28 where the IP header 28 includes the destination IP address 30.

Referring to FIGS. 1 & 2, the first step of the process relates to placing the data packet 24 into a form which can be sent over the network 10. This includes segmenting and repackaging the data packet 24 into one or more cells 32 with each cell 32 being of a format which is compatible with the network 10. For the preferred embodiment of the invention, the network 10 uses the ATM protocol for data message transfers therefore, for this embodiment, ATM AAL protocols must be adhered to in the segmenting and repackaging of the data packet 24. A more detailed discussion of ATM protocols can be found in CCITT, "Draft Recommendation I.363". CCITT Study Group XVIII, Geneva, Jan. 19–29, 1993. ATM protocols, and in particular the ATM Adaptation Layer 5 (AAL5) protocol, requires the data packet 24 to be segmented and repackaged into one or cells 32 with each cell 32 having a length of 53 octets. Of these 53 octets, the ATM protocol specifies that the first 5 octets of each cell 32 be reserved for the cell header 34 and the remaining 48 octets be reserved for the cell body 36 with the information from the data packet 24 (including the destination address 30) being distributed among one or more of the cell bodies 36. The cells 32 together form a cell packet 37.

The next step in the process relates to formatting each cell header 34 with information sufficient to route the cells 32 through the network 10 and to the first destination terminal 19. For every embodiment of the invention, a downlink beam identifier 40 is placed into the cell header 34 of each cell 32 of a cell packet 37. For the preferred embodiment, additional information is also placed into the cell headers 34 including a source terminal identifier 42, a cell type identifier 46 and cell loss priority information 48. A payload type identifier 50 exists in each cell header 34 and is set to a predetermined value for the last cell 32 of a cell packet 37. Optionally, header error correction information 52 is included in each cell header 34.

Referring to FIG. 2, to format the cell headers 34 with the proper downlink beam identifier 40, the following steps are conducted:

1) Each downlink antenna beam 22 in the network 10 (FIG. 1) is assigned a unique downlink beam identifier 40.

2) A lookup table (FIG. 3) is generated which maps destination addresses 30 to downlink beam identifiers 40.

3) The destination address 30 (FIG. 2) is identified in the message header 28 of the data packet 24.

4) The source terminal lookup table (FIG. 3) is consulted to map the destination address 30 with a downlink beam identifier 40. The downlink beam identifier 40 corresponds to the downlink antenna beam which covers the first destination terminal 19.

5) The downlink beam identifier 40 is placed in the cell header 34 (FIG. 2) of each cell 32 of the cell packet 37.

Referring to FIG. 2, to format each cell header 34 with a source terminal identifier 42, the following steps are conducted:

1) Each source terminal 16 (FIG. 1) is assigned a source terminal identifier 42 which is unique within the network 10.

2) The source terminal 16 sending the cells 32 places its unique source terminal identifier 42 into the cell header 34 of each cell 32 of the cell packet 37.

Referring to FIGS. 1 & 2, to format the cell headers 34 with information necessary to route the cells 32 in a connectionless manner through a network 10 which uses the ATM protocol and supports connection-oriented communications, the following additional steps are conducted:

1) The cell type identifier field 46 in each cell header 34 is set to a predetermined value indicating that the cell 32 is to be treated in a connectionless manner.

2) The cell loss priority field 48 is set to a predetermined value in accordance with ATM AAL5 to distinguish between high and low priority cells 32.

3) The payload type identifier field 50 is set to a predetermined value in each cell header 34 in accordance with ATM AAL5 and is used to identify the last cell of each cell packet 37.

4) If desired, additional information 52 can be placed in each cell header 34 to be used by the network 10 for header error correction. If header error correction information 52 is not included in the cell headers 34, the network 10 will need to provide the header error correction function.

The next step in the process relates to routing the cells 32 through the network 10 and to the first destination terminal 19. To do so, each satellite 12 generates a local lookup table. For the preferred embodiment of the invention, the local lookup tables are of the form shown in FIGS. 4a and 4b which map downlink beam identifiers 40 to local routing tags 58. Referring to FIGS. 1–3, the cells 32 are sent from the source terminal 16 to a satellite 12 where the satellite electronics (not shown) are programmed to recognize the cell type identifier field 42 in each cell header 34 and realize that the cells 32 are to be sent in a connectionless manner. The satellite electronics identify the downlink beam identifier 40 in each cell header 34 and consult a local lookup table 60 (FIG. 4a) for a local routing tag 58. This local routing tag 58 is used to route the cells 32 through the on-board cell switch 61 directly to the correct switch output port 62 on the satellite 12 which may be either a downlink antenna 20 or a crosslink antenna 14. Each satellite 12 has a unique lookup table 60 (FIG. 4a) or 64 (FIG. 4b) to accomplish this function, meaning that, the lookup for a downlink beam identifier 40 for one satellite 12 would result in a routing tag 58 which takes the cell 32 to a crosslink antenna 14 while in another satellite 12, the lookup for the same downlink beam identifier 48 would result in a routing tag 58 which takes the cells 32 to a downlink antenna 20. For example, in the first satellite local lookup table 60 shown in FIG. 4a, a downlink beam identifier of "10" routes the cell 32 to switch port 1 which is a crosslink antenna 14 whereas in the second satellite local lookup table 64 shown in FIG. 4b, the downlink beam identifier of "10" routes the cell 32 to switch port 2 which is a downlink antenna 20. This allows each satellite 12 to determine how to route the cells 32 and does not require the source terminal 16 or a satellite 12 to provide end-to-end routing information. In this way, each satellite look up table 60 (FIG. 4a) or 64 (FIG. 4b) can be a local table such that a table which is common to the network 10 is not required to route the cells 32.

The cells 32 are routed through each successive satellite on-board cell switch 61 until the cells 32 arrive at the satellite 12 that contains the downlink antenna beam 22 corresponding to the downlink beam identifier 40. This satellite 12 identifies the downlink beam identifier 40 in each cell header 34 and routes the cells 32 to the particular downlink antenna 20 corresponding to the desired downlink antenna beam 22. The selected downlink antenna 20 broadcasts all the cells 32 in a packet 37 over the selected downlink antenna beam 22. The destination terminals 18 & 19 within the selected downlink antenna beam 22, which includes the first destination terminal 19, receive all the cells 32.

The next step of the process relates to sorting the cells 32. If more than one source terminal 16 is sending cells 32 to the same downlink antenna beam 22 at any given time, the cells 32 from different source terminals 16 can become interleaved together prior to transmission over a downlink antenna beam 22. Then, the destination terminals 18 & 19 must sort or demultiplex the cells 32 sent to correctly reassemble the data packet 24. To do so, the destination terminals 18 & 19 sort the cells 32 by source terminal identifier 42. Cells 32 sent from a given source terminal 16 are sent in sequential order such that the cell order for a particular cell packet 37 is retained during transmission, and, cells 32 from different cell packets 37 from the same source terminal 16 are not interleaved before transmission; therefore, to successfully sort the cells 32 it is only necessary to identify all the cells 32 from a cell packet 37.

The next step in the process relates to filtering out only those cell packets 37 destined for the first destination terminal 19. Each destination terminal 18 & 19 covered by the selected downlink antenna beam 22 receives all the cells 32 of all cell packets 37 sent down the beam 22 and must make a decision whether to keep the cells 32 or discard them. Since the cell headers 34 do not contain sufficient information to enable the destination terminals 18 & 19 to make this determination, each destination terminal 18 & 19 must identify the destination address 30 and determine if the destination address 30 matches either the destination terminal's own address or matches a user's address 54 which is reachable from the destination terminal 18 & 19.

The destination terminal address 30 may be distributed among one or more of the cell bodies 36, therefore, to identify the destination address 30, each destination terminal 18 & 19 can either identify the destination address 30 from the cell bodies 36 or can at least partially reassemble the message header 28 to identify the destination terminal address 30 which will be located within the message header 28 once the message header 28 is reassembled. After identifying the destination address 30, each destination terminal 18 & 19 uses known routing mechanisms to determine if the destination address 30 matches either the destination terminal's own address or is reachable from the destination terminal 18 & 19. If not, the cells 32 are discarded. The first destination terminal 19 having the corresponding destination address 30 or which can reach the user 54 which corresponds to the destination address 30 retains all the cells 32 and completely reassembles the data packet 24. If the destination address 30 is the first destination terminal's own address, the first destination terminal 19 will keep the data packet 24 otherwise, the first destination terminal 19 will forward the data packet 24 on to the user 54 which corresponds to the destination address 30 through a separate network 68 such as an ethernet network, another ATM type network, or any other data transfer network known to one skilled in the art.

The present invention utilizes the broadcast capability of a satellite network by using a beam identifier 40 to route the cells 32 to the downlink antenna beam 22 covering a desired destination terminal 19, and, determining from the destination address 30 for whom a particular data packet 24 is meant, thereby avoiding placing a destination terminal identifier in the cell header 34 of each cell 32. In addition, by placing a source terminal identifier 42 into each cell header 34 to be used by destination terminals 18 & 19 to sort cells 32, the present invention is compatible with the ATM Adaptation Layer 5 (AAL5) protocol which is the adaptation layer protocol of choice by one skilled in the art.

It will be appreciated by persons skilled in the art that the present invention is not limited to what has been shown and described hereinabove. The scope of invention is limited solely by the claims which follow.

What is claimed is:

1. A method for transferring a data packet between a first source terminal and a first destination terminal, in a communications device having a plurality of source terminals, destination terminals, satellites and downlink antenna beams, one of said downlink antenna beam covering said first destination terminal, each data packet including a destination address identifying a user for which said data packet is meant, said first destination terminal having the capability to reach said user, the method comprising the steps of:

assigning a unique downlink beam identifier to each said downlink antenna beam within said communications network;

mapping said destination address to a downlink beam identifier which corresponds to said antenna beam covering said first destination terminal;

segmenting said data packet into one or more cells each having a cell header, said cells comprising a cell packet;

inserting said downlink beam identifier into each said cell header;

sending said cells to one said satellite in said satellite network;

routing said cells to said downlink antenna beam corresponding to said downlink beam identifier;

broadcasting said cells over said downlink antenna beam;

receiving said cells by said first destination terminal;

identifying said destination address distributed amongst one or more cells;

recognizing by said first destination terminal that said destination address corresponds to a user which is reachable by said first destination terminal;

reassembling said data packet by said first destination terminal; and transferring said data packet between said first source terminal and said first destination terminal in a system which additionally uses the Asynchronous Transfer Mode for data message transfers;

wherein the step of segmenting said data packet into one or more cells each having a cell header further comprises the step of segmenting said data packet into one or more cells each having a cell header comprising a cell type identifier field, a cell loss priority field and a payload type identifier field.

2. The method as in claim 1, wherein the step of segmenting said data packet into one or more cells, each cell having a cell header further comprises the step of:

segmenting said data packet into one or more cells, each cell having a length of 53 octets of which 5 octets comprise a cell header.

3. The method as in claim 1, further comprising the step of:

setting said cell loss priority field to a first predetermined value to indicate a priority of said cell.

4. The method as in claim 1, further comprising the step of:

setting said payload type identifier field to a second predetermined value to indicate whether a cell is a last cell in said cell packet.

5. The method as in claim 1, further comprising the step of:

placing header error correction information into each said cell header.

6. A method for transferring a data packet, in a connectionless manner between a first source terminal and a first destination terminal, in a communications network which uses the Asynchronous Transfer Mode for data message transfers, said communications network having a plurality of source terminals, destination terminals, satellites and downlink antenna beams with one said downlink antenna beam covering said first destination terminal, in a system which additionally uses established connections for data message transfers, each data packet including a destination address identifying a user for which said data packet is meant, said first destination terminal having the capability to reach said user, the method comprising the steps of:

assigning a unique downlink beam identifier to each said downlink antenna beam within said communications network;

mapping said destination address to a downlink beam identifier which corresponds to said antenna beam covering said first destination terminal;

assigning a unique source terminal identifier to each said source terminal in said communications network;

segmenting said data packet into one or more cells, each cell having a length of 53 octets of which 5 octets comprise a cell header, each cell header comprising a cell type identifier field, a cell loss priority field and a payload type identifier field, said cells comprising a cell packet;

placing the downlink beam identifier corresponding to the antenna beam covering said first destination terminal into each said cell header;

placing the source terminal identifier corresponding to the first source terminal into each said cell header;

setting said cell type identifier to a predetermined value in each said cell header;

setting said cell loss priority field to a predetermined value in each said cell header to indicate that said packet is to be transferred in a connectionless manner;

setting said payload type identifier field to a predetermined value in each said cell header to indicate a last cell of said cell packet;

sending said cells to one said satellite in said satellite network;

routing said cells through said satellite network to said downlink antenna beam corresponding to said downlink beam identifier;

broadcasting said cells over said downlink antenna beam;

receiving said cells by destination terminals located within said downlink antenna beam, one said destination terminal being said first destination terminal;

sorting said cells by source terminal identifier by said destination terminals located within said downlink antenna beam;

identifying in said cell said destination address;

recognizing by said first destination terminal that said user corresponding to said destination address is reachable by said first destination terminal; and, reassembling said data packet by said first destination terminal.

7. The method as in claim 6, further comprising the step of:

placing header error correction information into each said cell header.

8. The method as in claim 6, further comprising the step of:

transferring an Internet Protocol data packet over said network in a connectionless manner, said Internet Protocol data packet having a destination Internet Protocol address which is said destination address.

* * * * *